US010498678B2

(12) United States Patent
Murtagh et al.

(10) Patent No.: US 10,498,678 B2
(45) Date of Patent: Dec. 3, 2019

(54) METHOD FOR USER REPORTING OF SPAM MOBILE MESSAGES AND FILTER NODE

(71) Applicant: Anam Technologies Limited, Dublin (IE)

(72) Inventors: John Murtagh, Dublin (IE); Padraig Murtagh, Dublin (IE); Kwok Onn Looi, Dublin (IE)

(73) Assignee: Anam Technologies Limited, Dublin (IE)

( * ) Notice: Subject to any disclaimer, the term of this patent is extended or adjusted under 35 U.S.C. 154(b) by 719 days.

(21) Appl. No.: 14/434,863

(22) PCT Filed: Oct. 11, 2013

(86) PCT No.: PCT/EP2013/071339
§ 371 (c)(1),
(2) Date: Apr. 10, 2015

(87) PCT Pub. No.: WO2014/057111
PCT Pub. Date: Apr. 17, 2014

(65) Prior Publication Data
US 2015/0281153 A1   Oct. 1, 2015

(30) Foreign Application Priority Data

Oct. 12, 2012   (EP) .................................. 12188439

(51) Int. Cl.
*G06F 15/16*   (2006.01)
*H04L 12/58*   (2006.01)

(52) U.S. Cl.
CPC .............. *H04L 51/12* (2013.01); *H04L 51/10* (2013.01); *H04L 51/38* (2013.01)

(58) Field of Classification Search
CPC ... H04L 51/12; H04L 12/585; H04L 12/5895; H04L 51/10; H04L 51/38
USPC .......................................................... 709/206
See application file for complete search history.

(56) References Cited

U.S. PATENT DOCUMENTS

| 7,500,096 | B2 * | 3/2009 | Lang | .................... H04L 12/585 713/153 |
| 7,552,176 | B2 * | 6/2009 | Atkinson | ............. G06Q 10/107 709/206 |
| 7,577,431 | B2 * | 8/2009 | Jiang | ........................ H04W 8/26 455/413 |

(Continued)

FOREIGN PATENT DOCUMENTS

| WO | 0228127 A1 | 4/2002 | |
| WO | WO 0228127 A1 * | 4/2002 | ........... G06Q 10/107 |

*Primary Examiner* — Melvin H Pollack
(74) *Attorney, Agent, or Firm* — The Webb Law Firm

(57) ABSTRACT

A method for user reporting of spam mobile messages includes causing mobile messages to pass through a filter node prior to delivery to a user and, in the filter node, creating a record corresponding to each mobile message. The record includes metadata extracted from the mobile message and the content of the mobile message. Each record is stored in an archive and each message is then routed to the user. The method also includes receiving a report message from the user indicating that a mobile message received by the user is a spam mobile message, retrieving the record corresponding to the spam mobile message from the archive, and associating the metadata in the retrieved record with the report message.

17 Claims, 10 Drawing Sheets

(56) References Cited

U.S. PATENT DOCUMENTS

| | | | | |
|---|---|---|---|---|
| 7,627,651 B2* | 12/2009 | Joy | H04L 63/029 | 707/999.001 |
| 7,647,376 B1* | 1/2010 | Jagger | H04L 12/585 | 709/206 |
| 7,797,003 B2* | 9/2010 | Hill | H04L 12/5855 | 455/412.1 |
| 7,937,468 B2* | 5/2011 | Libbey | G06Q 10/107 | 709/206 |
| 8,150,373 B1* | 4/2012 | Upadhyay | H04L 12/585 | 455/410 |
| 8,272,060 B2* | 9/2012 | Milliken | G06F 21/562 | 713/178 |
| 8,301,168 B2* | 10/2012 | Zubas | H04M 1/72547 | 455/414.3 |
| 8,353,035 B1* | 1/2013 | Coomer | H04L 51/12 | 713/187 |
| 8,458,268 B1* | 6/2013 | Cooley | H04L 51/12 | 709/206 |
| 8,630,669 B2* | 1/2014 | Kelly | H04W 4/14 | 455/412.1 |
| 8,635,291 B2* | 1/2014 | Keast | H04L 51/24 | 709/206 |
| 8,756,684 B2* | 6/2014 | Frantz | G06F 21/552 | 370/242 |
| 8,775,454 B2* | 7/2014 | Geer | G06F 17/30026 | 704/246 |
| 8,819,772 B2* | 8/2014 | Bettini | H04L 63/0245 | 709/219 |
| 8,892,139 B2* | 11/2014 | Marlow | H04W 4/14 | 455/466 |
| 8,918,881 B2* | 12/2014 | Bettini | H04W 4/001 | 713/188 |
| 8,924,488 B2* | 12/2014 | Bobotek | G06Q 10/10 | 455/412.1 |
| 8,943,573 B2* | 1/2015 | Siourthas | G06F 21/35 | 726/28 |
| 8,955,127 B1* | 2/2015 | Sokolov | G06F 17/30 | 726/22 |
| 9,070,116 B2* | 6/2015 | Leuca | G06Q 10/107 | |
| 9,071,949 B2* | 6/2015 | Mikan | H04M 1/656 | |
| 9,159,055 B2* | 10/2015 | Davis | G06Q 10/107 | |
| 9,292,600 B2* | 3/2016 | Midgen | H04L 12/5855 | |
| 2004/0058673 A1 | 3/2004 | Irlam et al. | | |
| 2005/0069096 A1* | 3/2005 | Claudatos | H04L 12/5855 | 379/88.08 |
| 2007/0124389 A1* | 5/2007 | Cai | H04L 51/12 | 709/206 |
| 2010/0049809 A1* | 2/2010 | Ladd | G06Q 10/107 | 709/206 |
| 2012/0173370 A1* | 7/2012 | Soroca | G06Q 30/0241 | 705/26.3 |
| 2013/0007882 A1* | 1/2013 | Devarajan | H04L 63/1416 | 726/24 |
| 2013/0097706 A1* | 4/2013 | Titonis | G06F 21/56 | 726/24 |
| 2013/0325991 A1* | 12/2013 | Chambers | H04L 51/12 | 709/206 |
| 2014/0006167 A1* | 1/2014 | Korn | G06Q 30/0267 | 705/14.64 |
| 2016/0099963 A1* | 4/2016 | Mahaffey | H04L 63/1433 | 726/25 |

\* cited by examiner

METHOD FOR USER REPORTING OF SPAM MOBILE MESSAGES AND FILTER NODE

CROSS-REFERENCE TO RELATED APPLICATIONS

This application is the United States national phase of International Application No. PCT/EP2013/071339 filed Oct. 11, 2013, and claims priority to European Patent Application No. 12188439.9 filed Oct. 12, 2012, the disclosures of which are hereby incorporated in their entirety by reference.

FIELD OF THE INVENTION

The present invention relates to handling of mobile phone messages, such as Short Message Service (SMS) and Multimedia Message Service (MMS) in a network, and in particular, to reporting and filtering of so-called "spam" mobile messages.

BACKGROUND TO THE INVENTION

SMS text messaging is rapidly becoming the messaging medium of choice for larger and larger segments of the public, and is now the most widely used data application in the world. It enables the sending of short text messages to mobile phones, and in this way it enables mobile phone users the benefits of limited functions from the worlds of paging, email and instant messaging. Typically, SMS messages are sent from one mobile telephone user to another, for example, confirming an appointment, or just simply sending a greeting. MMS messaging extends the capability of SMS messaging by allowing multimedia content to be sent to and from mobile phones.

Increasingly, businesses are also using SMS or MMS messages to communicate with customers and potential customers, for example, to send details of special offers or discount codes. Advertisers are also increasingly using SMS and MMS messaging to send unsolicited bulk messages, known as "spam", to mobile phone users indiscriminately. Fraudsters and other entities may also send unsolicited messages, such as "phishing" messages, messages with URLs pointing to malware sites, or messages with faked source numbers or addresses, to users. These messages are also considered to be spam. Such messages can be particularly irritating to users, not only for the inconvenience, but also because, in some markets, users are charged a fee per message received.

Heretofore, counteracting mobile phone spam has been hindered by the limited availability of mobile phone spam-filtering software. Furthermore, filtering SMS or MMS spam at the recipient device is an imperfect solution in markets where users are charged to receive messages, since the user would be charged for the message once the provider sent it, even if software on the device blocked it from appearing on the device's display. However, this problem is not present in most of the world outside North America, as users are not generally charged to receive messages. Nonetheless, a solution whereby spam messages can be filtered by the network before receipt by the user would be preferable. However, the issue is complicated further by the fact that in certain countries network operators are not permitted to view SMS or MMS message content without the consent of the message originator or recipient. Additionally, as spam content becomes more sophisticated, more complex anti-spam content filters that can be updated in real-time to control new spam threats are required. Categorisation of messages as spam is not straightforward and often requires human input.

In February 2010, the GSM Association (GSMA) announced a pilot program, called Spam Reporting Service (SRS), that allows subscribers to report SMS spam by forwarding it to short-code 7726. Mobile Network Operators can access the information stored by the SRS to learn about emerging spam threats. The SRS also allows Mobile Network Operators to obtain detailed information on the content, senders and reporters of spam and then take appropriate action, such as updating rules in any filter system that they have in their network. The user forwards the spam message to a short-code associated with an SRS server, usually short-code 7726, but different codes may apply in individual countries. The forwarded message is routed from the user via the SMSC in the normal way, and then delivered to the SRS server over Short Message Peer-to-Peer (SMPP), External Machine Interface (EMI) or other application protocol. Although the forwarded message contains the same text content as the spam message, it does not contain the calling number of the spam message; rather, the calling number of the forwarded message is the Mobile Subscriber Integrated Services Digital Network-Number (MSISDN) of the reporting user who forwards the message. Similarly, the forwarded message does not include other meta-data of the spam message that could potentially identify the source of the spam, such as the originating network address. In order to identify the calling number of the spam message, the SRS server returns an SMS request message to the reporting user (addressed by MSISDN), requesting the user to respond to this SMS request message with the calling number in a new SMS message. Other similar services are operated by other organisations, such as Fédération Française des Télécoms, which uses short code 33700.

Although this arrangement overcomes a number of the issues involved in spam filtering for SMS messages, there are a number of disadvantages associated with it. Firstly, by requiring the user to send a second text message, it provides a cumbersome and inconvenient user experience, which results in many users not sending a response to the request message, in which case the "spammer" or other source detail cannot be identified. Depending on the capabilities of the user's handset, the user may have to retype the calling number of the spam message manually when responding to the request message, and this can result in errors and thus unintentional categorisation of the mistyped calling number as a spam source. Furthermore, the calling number alone may not be sufficient to identify the source network and narrow down the source of the spam.

Spam-reporting applications or "apps" are also available for smartphones, such as those based on Android, iOS or Windows Phone platforms. An app is provided on the phone during manufacture, or downloaded to the phone, and may operate in an integrated manner with an SMS client on the phone. When an SMS or MMS message is opened by the user, a menu option to "Report as spam" may be provided. If the user selects this option, the app reads the content of and the metadata associated with the message from the phone or SIM card and transmits it to an SRS server. There are a number of drawbacks associated with this arrangement. It requires separate apps to be developed for each different platform. Additionally, unless the app is provided on the phone at the time of manufacture, the user must download the app to the phone which is inconvenient and may incur costs. Furthermore, mobile phones which are not smartphones and are thus not capable of running apps cannot avail of this technology. Another disadvantage is that the app can only access metadata which is stored on the phone or SIM card. For example, the source network address (SCCP Calling Party Address) of the spam message is not stored on the phone or SIM card and is thus not available to such apps.

It is therefore desirable to provide a method for user reporting of spam mobile messages, which provides an improved user experience and which has an improved ability to identify the source of mobile spam and which can be accessed by users regardless of the type of handset they are using.

SUMMARY OF THE INVENTION

According to an aspect of the present invention, there is provided a method for user reporting of spam mobile messages, characterised by:
   causing mobile messages to pass through a filter node prior to delivery to a user;
   in the filter node, creating a record corresponding to each mobile message, the record including metadata extracted from the mobile message and the content of the mobile message;
   storing each record in an archive;
   routing each mobile message to the user;
   receiving a report message from the user indicating that a mobile message received by the user is a spam mobile message;
   retrieving the record corresponding to the spam mobile message from the archive; and
   associating the metadata in the retrieved record with the report message.

Metadata may comprise information that can be used to identify the source of a mobile message. The method may further comprise the step of using the metadata to identify a source of the spam mobile message.

The term "spam" as used herein refers to any messages which are unsolicited or unwanted by the user. The term "mobile message" as used herein refers to any form of mobile telephone message, including both SMS and MMS messages.

There are a number of advantages associated with the present invention. The primary advantage is that because the metadata extracted from the original message is associated with the report message, the user need only forward the spam SMS message to a spam reporting short-code in order to report spam and is not required to provide further information, such as calling number, via subsequent text messages. This improves the user experience, thereby making it more likely that users will report spam mobile messages, which in turn allows spam filters in the network to be updated more regularly and accurately. It also eliminates errors due to erroneous entry of calling number details by users. The invention also does not rely on the user having a handset with particular capabilities, such as a smartphone, nor does it require any additional software or apps to be downloaded to the user's mobile phone.

The step of causing mobile messages to pass through the filter node may comprise causing mobile terminated, MT, messages to pass from a messaging centre node, such as a Short Message Service Centre, SMSC, or Multimedia Messaging Service Centre, MMSC, to the filter node prior to delivery to a user. In other embodiments, the step of causing mobile messages to pass through the filter node may comprise causing mobile originating, MO, messages or application originating, AO, messages to pass through the filter node prior to reaching the messaging centre node.

In an embodiment, the step of receiving the report message comprises intercepting the report message at the filter node and the steps of retrieving and associating are also carried out at the filter node. In this embodiment, the method further comprises relaying the report message and the associated metadata to a Spam Reporting Service, SRS, server before using the metadata to identify the source of the spam SMS message.

In certain embodiments, the step of receiving the report message comprises intercepting the report message at the filter node, and the method further comprises:
   relaying the report message from the filter node to a Spam Reporting Service, SRS, server;
   intercepting, at the filter node, a request from the SRS server for the metadata; and wherein
   associating the metadata with the report message comprises providing the metadata to the SRS server in an additional message in response to the request.

An advantage of this arrangement is that it may be used in conjunction with existing SRS servers, which use a two-stage dialog with the user. The report message is relayed to the SRS server, which issues a request for the metadata according the prior art reporting arrangement. However, rather than being relayed to the user as in the prior art, the request is intercepted by the filter node which provides the retrieved metadata to the SRS server in response to the request. This means that the user need only send a single report message, but the invention can be implemented using existing SRS servers without significant modification.

In an alternate embodiment, the receiving step comprises receiving the report message at the SRS server. The steps of retrieving the metadata and/or associating it with the report message may be carried out by the SRS server. The SRS server may interact directly with the archive or may communicate with the filter node to retrieve the metadata and associate it with the report message. In other embodiments, the step of retrieving the metadata may be carried out by an SMSC or by an SMS Gateway, SMS-GW, or by another message transfer node.

Typically, each mobile message is routed to the user via a messaging centre node, such as an SMSC or an MMSC. The filter node may simply intercept the messages prior to delivery and allow them to pass to the user once the record has been created.

The archive of records corresponding to mobile messages may be stored at the filter node, for example, in an on-board storage area, or in a separate node, such as an archive node. In certain embodiments, the archive node and the SRS server may be co-located.

Preferably, the metadata extracted from the mobile message includes a calling or originating number of the mobile message. The metadata may also include a destination number of the mobile message. The metadata extracted from the mobile message may further include one or more of:
   a source network address of the mobile message;
   a network address of a messaging centre node such as a Short Message Service Centre, SMSC, node or Multimedia Messaging Service Centre, MMSC, node associated with the mobile message;
   an International Mobile Subscriber Identity, IMSI, associated with the user;
   an International Mobile Subscriber Identity, IMSI, associated with a source of the mobile message;
   a Mobile Switching Centre, MSC, or Visitor Location Register, VLR, address associated with the user;
   a MSC/VLR address associated with the source of the mobile message;

an International Mobile Equipment Identity, IMEI, associated with the source of the mobile message;
an Internet Protocol, IP, address associated with the source of the mobile message; and
a cell-id associated with the source of the mobile message.

Where the mobile message is an MMS message, the metadata may further include one or more of:
a peer MMSC identity;
a peer MM4 gateway address;
an originating IMSI;
an originating cell-id;
an originating IMEI;
an originating Value-Added Service Provided, VASP, id;
an originating IP address;
an originating Gateway GPRS Support Node, GGSN, IP address;
an originating terminal IP address; and
an originating terminal Media Access Control, MAC, address.

Other types of metadata may be extracted from the message as appropriate.

In GSM networks, the source network address of the mobile message may be an E.164 digit address carried in an SCCP Calling Party Address field. In CDMA networks, the source network address of the mobile message may be an E.212 digit address carried in the SCCP Calling Party Address field.

An advantage of this arrangement is that more than one piece of metadata may be extracted from the mobile message and stored in the record. If the mobile message is subsequently reported as a spam message, all of the stored metadata may be made available to the SRS with the report message to facilitate identification of the source of the spam.

The content of the message may be used to identify the record corresponding to a spam mobile message. The content of the message may be stored in clear text format or in the form of a content hash key based on an algorithm performed on the content characters of the SMS message. The content hash key may be based on a checksum of the content characters of the SMS message. Other algorithms may alternatively be used. For each mobile message having different content, a unique content hash key can be generated, thereby allowing the record corresponding to a spam message to be subsequently identified and retrieved based on the content hash key.

The retrieval step may further comprise:
upon receipt of the report message from the user, computing a content hash key of the content of the report message; and
identifying the record corresponding to the mobile message by comparing the content hash key of the report message and the MSISDN or calling number of the user to a plurality of records in the archive.

The calling number of the user may be compared to a destination number of the mobile message to identify the record corresponding to the mobile message.

Preferably, the report message is a mobile message forwarded by the user to a spam reporting address in order to report the message as spam. The spam reporting address may be a short-code or a long number.

Associating the metadata in the retrieved record with the report message may comprise:
creating a new report message including the report message and the metadata;
appending the metadata to the report message; or
providing the metadata in an additional message in response to a request.

In one embodiment, the method further comprises the steps of:
forwarding the report message to an SRS server;
intercepting a request from the SRS server for the metadata; and
providing the metadata in an additional message in response to the request.

According to another aspect of the invention, there is provided a system for user reporting of spam mobile messages, characterised by:
means for causing mobile messages to pass through a filter node prior to delivery to a user;
means, in the filter node, for creating a record corresponding to each mobile message, the record including metadata extracted from the mobile message and the content of the mobile message;
means for storing each record in an archive;
means for routing each mobile message to the user;
means for receiving a report message from the user indicating that a mobile message received by the user is a spam mobile message;
means for retrieving the record corresponding to the spam mobile message from the archive; and
means for associating the metadata in the retrieved record with the report message.

The system may further comprise means for using the metadata to identify the source of the spam mobile message.

According to another aspect of the invention, there is provided a method for facilitating user reporting of spam mobile messages in a filter node, characterised by:
intercepting mobile messages prior to delivery to a user;
creating a record corresponding to each mobile message, the record including metadata associated with the mobile message and the content of the mobile message;
storing each record in an archive;
allowing each intercepted mobile message to pass to the user;
intercepting a report message from the user indicating that a mobile message received by the user is a spam mobile message;
retrieving the record corresponding to the spam mobile message from the archive;
associating the metadata in the retrieved record with the report message; and relaying the report message and the associated metadata to a Spam Reporting Service, SRS, server.

According to a further aspect of the invention, there is provided a filter node for facilitating user reporting of spam mobile messages, the node characterised by:
means for intercepting mobile messages prior to delivery to a user;
means for creating a record corresponding to each mobile message, the record including metadata extracted from the mobile message and the content of the mobile message;
means for storing each record in an archive;
means for allowing each intercepted mobile message to pass to the user;
means for intercepting a report message from the user indicating that a mobile message received by the user is a spam mobile message;
means for retrieving the record corresponding to the spam mobile message from the archive;
means for associating the metadata in the retrieved record with the report message; and
means for relaying the report message and the associated metadata to a Spam Reporting Service, SRS, server.

The report message and the associated metadata may be relayed to the SRS server in separate messages or in a single message. The metadata may be relayed to the SRS server in response to a request.

DETAILED DESCRIPTION OF THE DRAWINGS

Figure 1A:
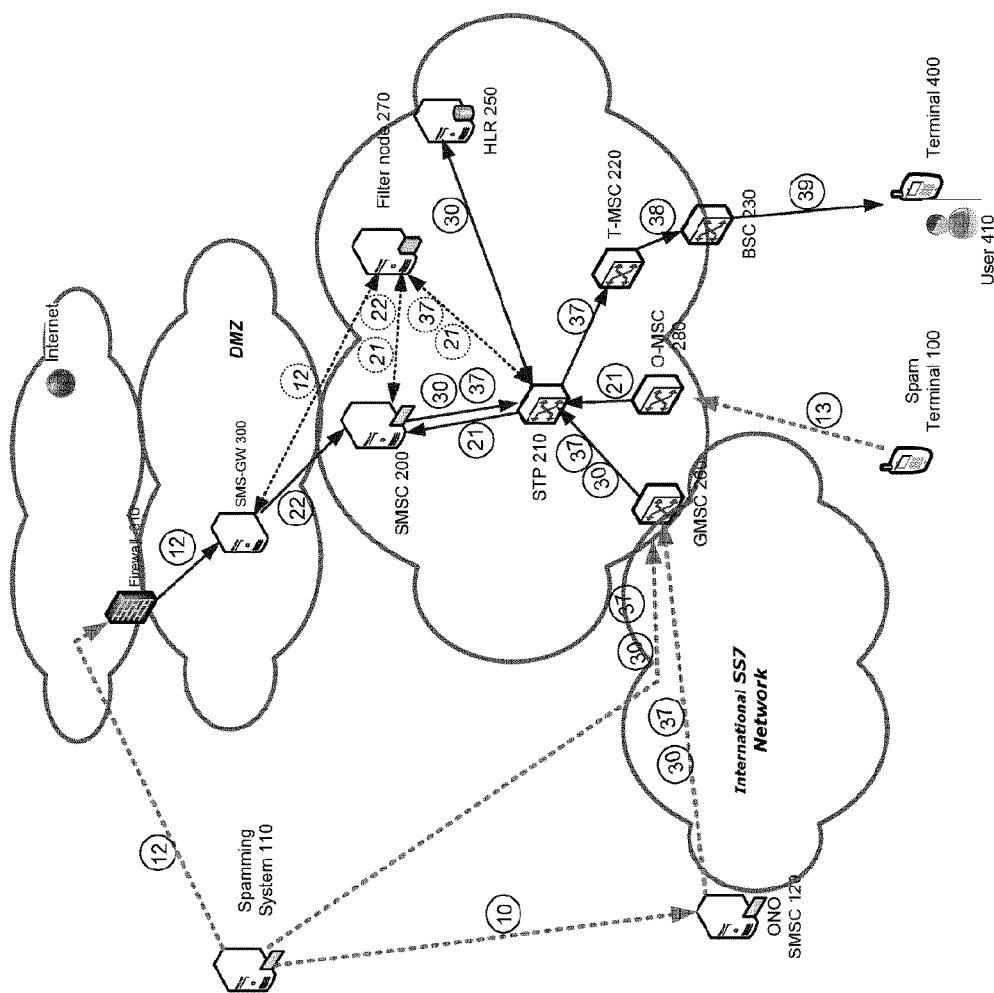
FIG. 1a is a block diagram of a portion of a prior art mobile telecommunications network.

FIG. 1a illustrates a prior art 2G GSM mobile network, which is vulnerable to spam SMS messages being delivered to subscribers, such as user 410, of the network.

The mobile network comprises a plurality of known network nodes or entities. The network comprises a Short Message Service Centre (SMSC) 200 and a plurality of Mobile Switching Centre (MSC) entities 220, 260, 280. A Gateway MSC (GMSC) 260 is a border entity MSC, which interfaces to other external networks (mobile or fixed) for the purpose of routing and switching voice and SMS communication. An originating MSC (O-MSC) 280 is an MSC entity associated with an originating leg of a voice or SMS communication. Similarly, a terminating MSC (T-MSC) 220 is an MSC entity associated with a terminating leg of a voice or SMS communication. A Base Station Controller (BSC) 230 controls communication to a number of Base Transceiver Stations (BTS) (not shown) in a coverage area under control of the T-MSC. Although not shown in FIG. 1a, a BTS is logically located between BSC 230 and mobile terminal device 400.

A Signaling Transfer Point (STP) 210 is a router for signaling (SS7) traffic. SS7 is the most widespread signaling protocol in use in 2G and 3G mobile networks today. Most STPs support "SS7 over TDM" links and "SS7 over IP" links (also known as SIGTRAN). STP functions are often embedded into physical MSC nodes depending on network implementation and the vendor of the MSC.

A Home Location Register (HLR) 250 is a network database, in which subscribers of the mobile network are provisioned. The HLR also provides mobility management functions and supplementary services control. Often there are multiple HLR nodes, with each HLR node responsible for a distinct set of subscribers. The next generation equivalent of a HLR is a Home Subscriber Server (HSS).

A Short Message Service Centre (SMSC) 200 is the network node responsible for the storage and delivery of SMS messages in the mobile network. SMS messages can be originated by mobile devices or application entities (commonly known as Large Accounts or ESMEs). In the typical mobile network shown in FIG. 1a, an SMS Gateway (SMS-GW) 300 is used to control and route the SMS traffic originated by application entities and terminated towards application entities. Application entities can be located outside or inside the mobile network operator's domain. An IP Firewall 310 is deployed to provide secure IP level access for external application entities and to protect the network from vulnerable IP attacks.

A prior art Filter Node 270 is deployed in the network shown to detect and optionally block "spam" SMS messages. The Filter Node 270 may also be able to detect other types of spam traffic transported over different bearers such as email, web and instant messaging traffic.

In the network of FIG. 1a, a spam SMS message may reach a subscriber's terminal device 400 via a number of different paths depending where and how the spam SMS is originated.

Spam SMS messages may be originated by a Spamming Server 110 or by an "on-net" mobile terminal device 100 which may be a modem or a SIM-box type device. Use of SIM-box devices for fraudulent purposes is well known. A SIM-box terminal usually originates a spam SMS as an Mobile Originated SMS (MO-SMS) message (signal 13), which is routed by the O-MSC 280 as an SS7 MAP signal 21 via the STP 210 to the SMSC 200. The SMSC 200 will proceed to deliver the message to the terminal 400, by first sending a MAP query signal 30 to the HLR and then a Mobile Terminated SMS (MT-SMS) message is routed as a MAP signaling message 37 via the STP 210 to the terminating MSC 220. The terminating MSC 220 routes the MT-SMS further as signaling message 38 to the BSC which delivers the SMS message as a radio interface message 39 to the subscriber's mobile terminal device 400. The mobile device 400 usually alerts the user 410 with a beep that an SMS message has been received. It should be noted that any of the MAP signaling messages 21 or 37 (which contain the SMS message) may be caused to be routed via a Filter Node 270, which potentially can detect and block the spam SMS message. This routing via the Filter Node is depicted as a dotted line in FIG. 1a. In an alternate network configuration, the Filter Node 270 may be directly integrated to the SMSC 200 and the SMSC would be responsible for passing the SMS message (shown as a dotted line with signal 21 between the SMSC and the Filter Node in FIG. 1a) to the Filter Node for spam detection purposes. Other known options also include having the Filter Node function embedded in the SMSC.

According to another method by which spam SMS messages are commonly generated, a Spamming System 110 can originate an SMS message 12 via the Internet and route the message in a manner such that it enters the mobile network via the SMS-GW 300. It is well known that some networks have "open" application connections in their SMS-GW node where the inbound SMS traffic is passing with just some basic validation checks. Spam SMS messages, which are often sophisticated, can easily bypass these checks. The SMS message 12 may be converted to use a different transport protocol such as SMPP or EMI (signal 22). SMS-GW routes the SMS message 22 to the SMSC 200. The SMSC then delivers the SMS message to the recipient subscriber's mobile device 400 as an MT-SMS. The path chosen is the same as that previously described, that is, the SMSC 200 will proceed to deliver the SMS message, by first sending an SS7 MAP query signal 30 to the HLR and then routing the MT-SMS message as a MAP signaling message 37 via the STP 210 to the terminating MSC 220. The terminating MSC 220 routes the MT-SMS further as signaling message 38 to the BSC which delivers the message as a radio interface message 39 to the subscriber's mobile terminal device 400. Again, it should be noted that any of the messages 12, 22 or 37 (which contain the SMS message) may be caused to be routed via a Filter Node 270, which potentially can detect and block the spam SMS message. This routing via the Filter Node is depicted as dotted-line signals in FIG. 1a. The actual path will depend on where the routing to the Filter Node is implemented.

According to another method by which spam SMS messages are commonly generated, a Spamming System 110 can originate an SMS message 10 via another network operator's SMSC (ONO SMSC) 120. The ONO SMSC 120 shall then use MAP signaling messages consisting of a HLR Query 30 and an MT-SMS signal 37 to deliver the message towards the T-MSC 220 and onwards to the target subscriber's terminal 400. Again, it should be noted that the signaling message 37 (which contains the SMS message) may be caused to be routed via a Filter Node 270, which potentially can detect and block the spam SMS message. The dotted line and message 37 from the STP 210 to the Filter Node 270 depict such routing via the Filter Node.

Another variation is that the Spamming System 110 may be a system with an SS7 interface which can access the international signaling network directly or indirectly (via a facilitating entity) and directly send MT-SMS message using the standardized MAP signaling messages (consisting of HLR Query 30 and MT-SMS delivery signal 37) for delivering SMS message towards the T-MSC 220 and onwards to the target subscriber's mobile device terminal 400. Often, spamming systems avoid the HLR Query signal 30 to evade detection and just use MT-SMS delivery signal 37 to direct the spam SMS message to the target subscriber. Again, it should be noted that signaling message 37 may be caused to be routed via a Filter Node 270, which potentially can detect and block the spam SMS message. The dotted line and message 37 from the STP 210 to the Filter Node 270 depict such routing via the Filter Node.

Although many networks have Filter Nodes (also known as SMS Firewalls) deployed, their filtering checks or rules are often not sophisticated enough to detect spam SMS messages.

Figure 1B:
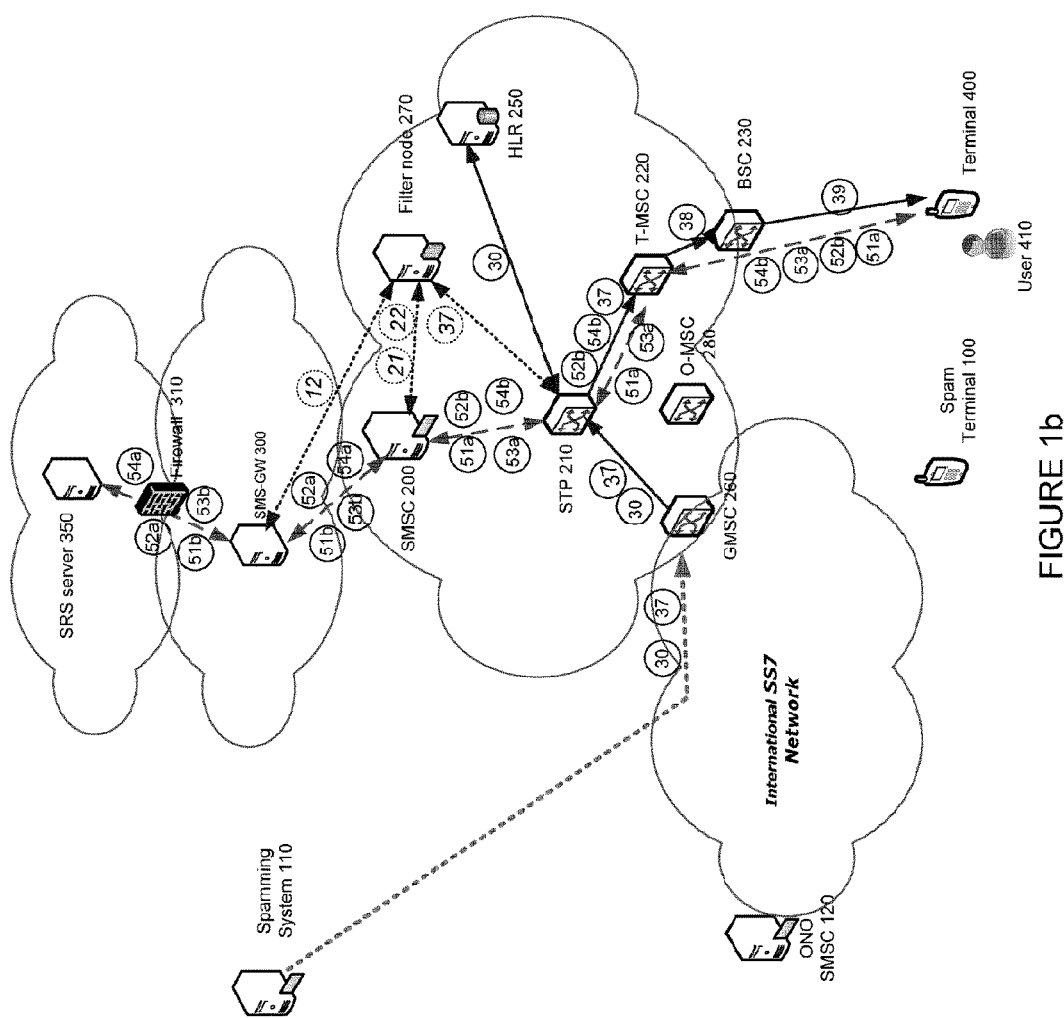
FIG. 1b is a block diagram of a portion of a prior art mobile telecommunications network, which implements a spam reporting service.

FIG. 1b illustrates a typical mobile network which implements a prior art Spam Reporting Service.

A Spam Reporting Service (SRS) Server 350 is usually deployed outside the mobile network domain, as shown in FIG. 1b, and operated by an independent entity such as the GSMA or the Fédération Française des Télécoms. It connects to the mobile network operator's SMSC 200 via a protocol such as SMPP or EMI. Often this connection traverses a Firewall 310 and an SMS-GW 300 as shown in FIG. 1b, though this is not mandatory. In alternate embodiments, the SRS server 350 may be located inside the mobile network operator's domain, where then it would serve as an SRS for that mobile network operator only. In theory it could also be co-located with a Filter Node 270 either in a loose or tight manner. The SRS server 350 is addressed using a short-code number or a long-code number. A short-code number is mostly used as it is easier for users to remember and it also makes publicity and advertisement easier.

Figure 2:
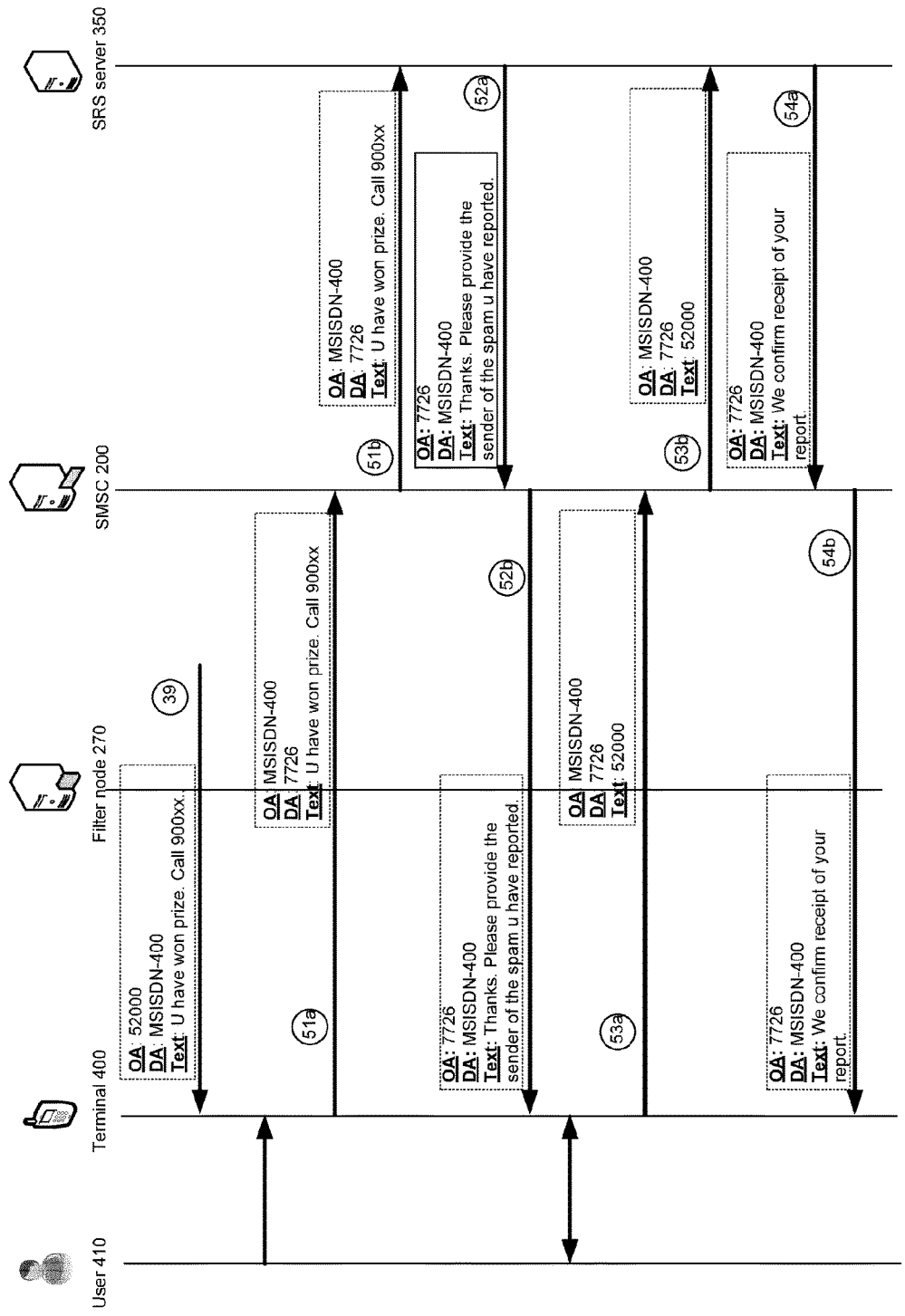
FIG. 2 is a call flow diagram of a prior art user spam SMS report.

FIG. 2 illustrates a prior art user-initiated spam report as implemented in the network of FIG. 1b. A user 410 has received a spam SMS message on his terminal 400. It arrives to his terminal as an MT-SMS delivery signal 39 delivered over the radio interface. Based on the content and/or the calling number, the user decides that the SMS message is a spam SMS message. Knowing that his operator provides access to a in spam reporting service, he then forwards the spam SMS to the SRS address, which in the illustrated case is short-code "7726". The user uses an SMS forward function provided on his mobile terminal 400 to forward the spam SMS message, thereby creating a report message 51a, which is routed to the SMSC. The SMSC accepts this report message and then routes it to the SRS destination number "7726". The application server that serves number "7726" is, in fact, the SRS server 350, which is reachable via an application connection to the SMSC. The spam report SMS message 51b is transported to the SRS server 350 using a transport protocol such as SMPP or EMI.

The spam report SMS message 51a, 51b does not contain the calling number from which the spam SMS originated (digits "52000" as shown in the example of FIG. 2), and so the SRS server 350 sends a request SMS message 52a back to the reporting user's terminal 400. The text of this request SMS message is a request to the user 410 to supply the missing calling number contained in the received spam message 39. The request SMS message 52a is submitted to the SMSC and the SMSC delivers it as an MT-SMS 52b to the user's mobile terminal 400. The user 410 reads the response and if he decides to facilitate the request, he then generates a reply SMS back to the SRS service containing the calling number of the spam SMS message 39. The calling number may be a digit address or an alphanumeric address. In the example shown in FIG. 2, the address comprises the digits "52000". The terminal 400 then sends the reply SMS message 53a to the SMSC 200, which then delivers it as an SMS message 53b to the SRS server 350. Now the SRS server has sufficient detail to categorise the reported spam SMS message in its database for reporting and further analysis functions.

The SRS server 350 may optionally close out the SMS dialogue with the user 410 by sending back a final SMS message, denoted 54a and 54b in FIG. 2, for example thanking him/her for reporting the spam.

Figure 3:
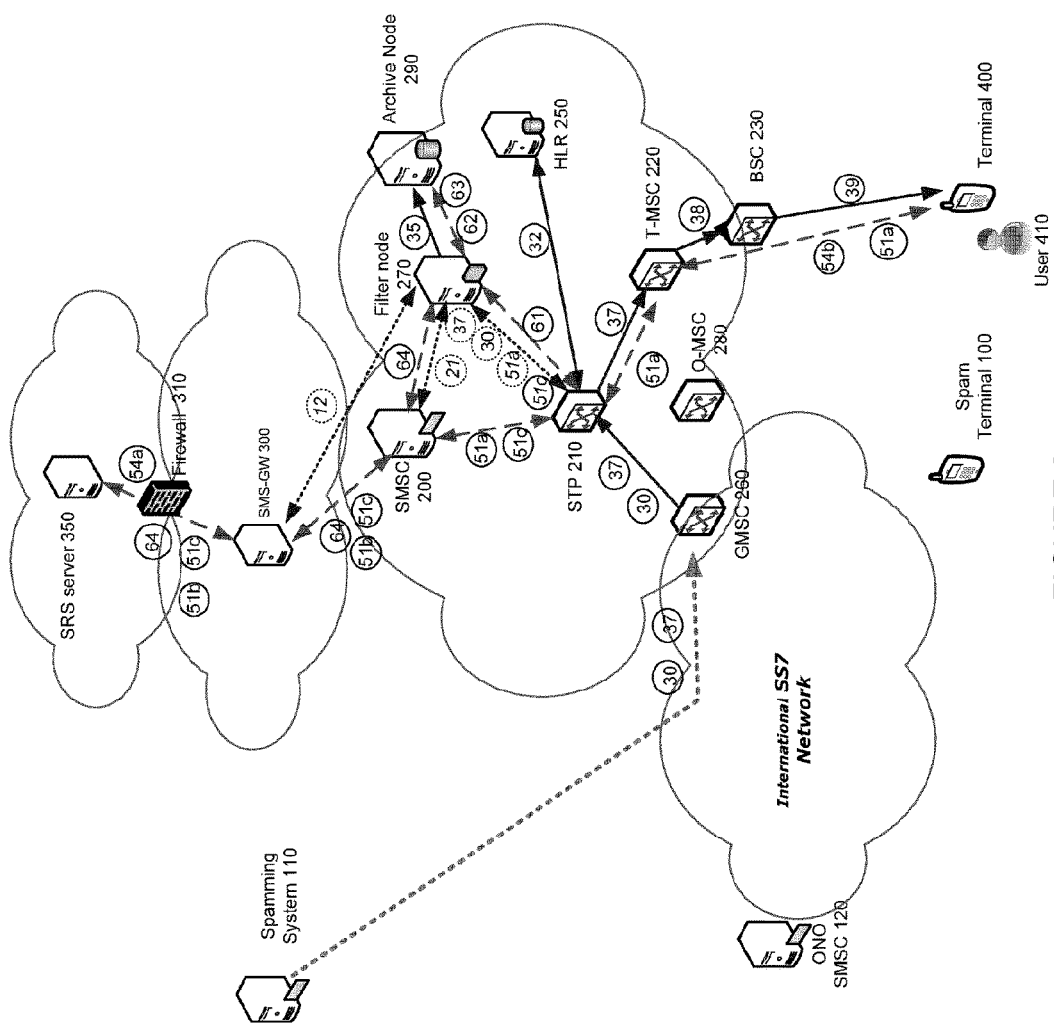
FIG. 3 is a block diagram of a portion of a mobile telecommunications network, according to an embodiment the present invention.

FIG. 3 is a block diagram of a mobile network, embodying the present invention. The mobile network is configured such that all SMS traffic sources which are considered potentially vulnerable to spam SMS messages are caused to pass through Filter Node 270 prior to delivery to user 410. The Filter Node may be integrated to the STP 210, SMSC 200, SMS-GW 300 or multiple combinations thereof. Filter Node 270 may be configured as a passive filtering node which simply captures SMS traffic which passes therethrough, or it may be an active filtering node which has the capability to block an SMS message based on a set of spam detection and filtering rules or algorithms. The Filter Node 270 creates a record corresponding to each SMS message which passes therethrough. The record includes metadata extracted from the SMS message and the content of the message.

The network further comprises an Archive Node 290. The Archive Node stores each of the records created by the Filter Node in a storage area or archive. The storage area can be a database or any other searchable storage media. The Archive Node may be a separate physical node to the Filter Node or it may be co-located physically or logically. Most importantly, the network or the SMSC 200 or the SMS-GW 300 is configured to route MO-SMS messages destined to the SRS address via the Filter Node 270, that is, the Filter Node is configured to intercept report messages from users indicating that an SMS message received by the user is a spam SMS.

Figure 4:
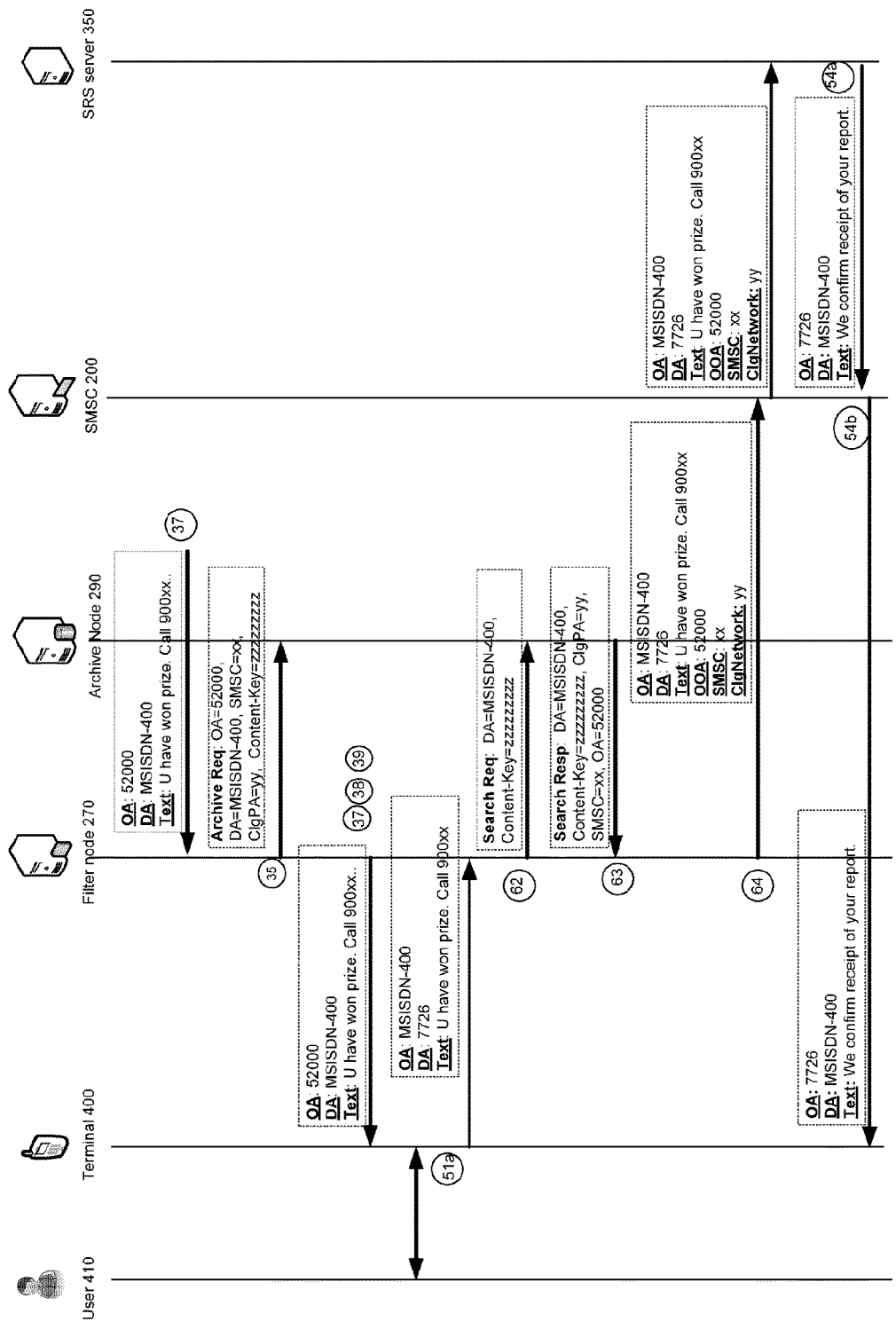
FIG. 4 is a call flow diagram showing the operation of the network of FIG. 3.

FIG. 4 is a call flow diagram illustrating a method for user reporting of spam SMS messages using the network of FIG. 3. As set out above, the network has been configured to cause all SMS messages coming from vulnerable sources to pass through the Filter Node 270. These are shown as dotted-line signals in FIG. 3. The actual path taken will depend on which node in the network routed the message towards the Filter Node. In FIG. 3, the STP routes all MAP HLR query messages (signal 30) and MT-SMS messages (signal 37) via the Filter Node 270. However, the same spam reporting method may be used for SMS messages that pass to the Filter Node via other paths. The Filter Node 270 creates a record 35 corresponding to SMS message 37. The record includes the text content of the message and metadata extracted from the message, such as Originating Address (or Calling Number), Destination Address, originating SMSC address, originating network address, etc. The Filter Node 270 may optionally generate a unique id or content hash key for the content of the SMS message which can be stored along with the original text content or in place of the original text content. The content hash key can be a checksum of the content or any unique hash value that the content characters or octets can generate. The record 35 is transmitted to the Archive Node 290 for storage.

As the intercepted SMS message 37 is not detected as spam by the Filter Node, the Filter Node routes the SMS message 37 onward via the T-MSC and the BSC (as signal 38) and it arrives to the mobile device 400 as an MT-SMS delivery signal 39 delivered over the radio interface. When user 410 receives the SMS message at his mobile terminal 400, he identifies it as a spam SMS (based on the content and potentially the calling number). Knowing that his operator provides a spam reporting service, he then forwards the spam SMS to the SRS address, which in the embodiment shown is "7726". The user uses an SMS forward function provided on his mobile terminal 400 to forward the spam SMS message, thereby creating a report message 51*a* which is routed to the SMSC. The network or SMSC is configured to route messages destined to the SRS address via the Filter Node 270. Thus, the report SMS message 51*a* indicating that the message 39 is spam is routed to the Filter Node 270.

The Filter Node analyses the report SMS message 51*a* and, based on the destination address value, the Filter Node detects that the message is destined to the SRS server. The Filter Node determines that it should associate the original Calling Number and other metadata with the spam report SMS message. To achieve this, the Filter Node generates a content hash key from the content of the report SMS message and sends a query (signal 62) to the Archive Node 290 requesting the Archive Node to retrieve the record corresponding to the spam SMS message from the archive. The query signal 62 contains the generated content hash key and the destination address of the original spam SMS message (which is actually the originating address of the report SMS message).

The Archive Node 290 searches its store to find the record 35 corresponding to the original MT-SMS message 37 by matching the content hash key and the destination address. Once the original message is found, the Archive Node returns a query response 63 to the Filter Node 270. The query response 63 contains the Calling Number and the other metadata (e.g. SMSC address, originating network address, etc) which was stored with the original spam SMS message. The Filter Node 270 associates the metadata with the report SMS message 51*a* and forwards it to the SRS server to allow the SRS server to identify the source of the spam SMS message. The forwarding of the metadata to the SRS server can be done in a number of ways.

In one embodiment, the Filter Node terminates the report SMS message (ensuring that the originating device 400 receives a positive acknowledgement) and creates a new report SMS message with the same Originating Address, Destination Address (SRS address) and original text content. The Filter Node also adds the Calling Number and other metadata from the original spam SMS message 37 (as retrieved from the archive in the query response 63) to the new report SMS message as optional parameters and then submits this directly as signal 64 to the SMSC 200 for onward delivery to the SRS server. This method is supported when SMPP protocol is used to implement signal 64, as SMPP supports the addition of optional parameters. Other protocols can also be used.

In another embodiment, the Filter Node adds the Calling Number and the other meta-data of the original spam SMS message 37 to the report SMS message as additional specially formatted text which is appended or pre-pended to the original report SMS text content. The Filter Node then relays the "modified" report SMS message to the SMSC 200 via the STP as signal 51*c* as shown in FIG. 3. The SMSC 200 then delivers the modified report SMS message as signal 51*c* to the SRS server 350. This method is easily implemented if the report SMS message contains enough empty space to cater for the added Calling Number and other meta-data. However as SMS message segments are generally limited to 160 characters, this method of providing the Calling Number and other metadata may not always be viable.

In another embodiment the Filter Node terminates the report SMS message (ensuring that the originating device 400 receives a positive acknowledgement) and creates a new report SMS message with the same Originating Address, Destination Address (SRS address) and original text content. The Filter Node then adds the Calling Number and other metadata from the original spam SMS message 37 retrieved from the archive node to the new report SMS message as additional specially formatted text which is appended or pre-pended to the report SMS text content. The Filter Node then submits this new report SMS message directly as signal 64 to the SMSC 200 for onward delivery to the SRS server. Note that the free message space limitation described in the previous embodiment does not necessarily apply here as the modified spam report SMS message can contain additional SMS segments to cater for the additional message content containing the Calling Number and the other meta-data.

FIG. 4 describes one embodiment of the invention. In an alternate embodiment, the Filter Node 270 and the Archive Node 290 may be co-located. In this embodiment, the Filter Node uses its own internal lookups (equivalent to signals 62 and 63) to find the record corresponding to the original spam SMS message in the archive.

In another alternate embodiment, the mobile network may be configured to cause the messages destined to the SRS server to be routed to the Filter Node by the SMSC 200 or the SMS-GW 300.

In another embodiment, the SMSC 200 or the SMS-GW 300 can retrieve the Calling Number and other metadata directly from the Archive Node 290 using a request-response type protocol. Similar to the Filter Node, the SMSC 200 or SMS-GW 300 must specify the content hash key and the destination address of the spam SMS message (which is the originating address of the report SMS message 51*a*) in the request to the Archive Node.

In another embodiment, the SRS server 350 may retrieve the Calling Number and other meta-data directly from the Archive Node 290 using a request-response type protocol.

In another embodiment, the Filter Node can request the Archive node to store the original message content (which may be encrypted for security reasons) with the recorded SMS messages. Any query can then be based on the report SMS message content. This embodiment can be used in countries where storage of personal message content is allowed. However it should be noted that this method has a number of distinct disadvantages. One disadvantage is that the amount of storage space required in the Archive Server will be significantly larger than the case where only a (short) content hash key is recorded. A second disadvantage is that lookup and searching based on original message content may not be as optimal as that associated with a structured content hash key value.

Figure 5A:
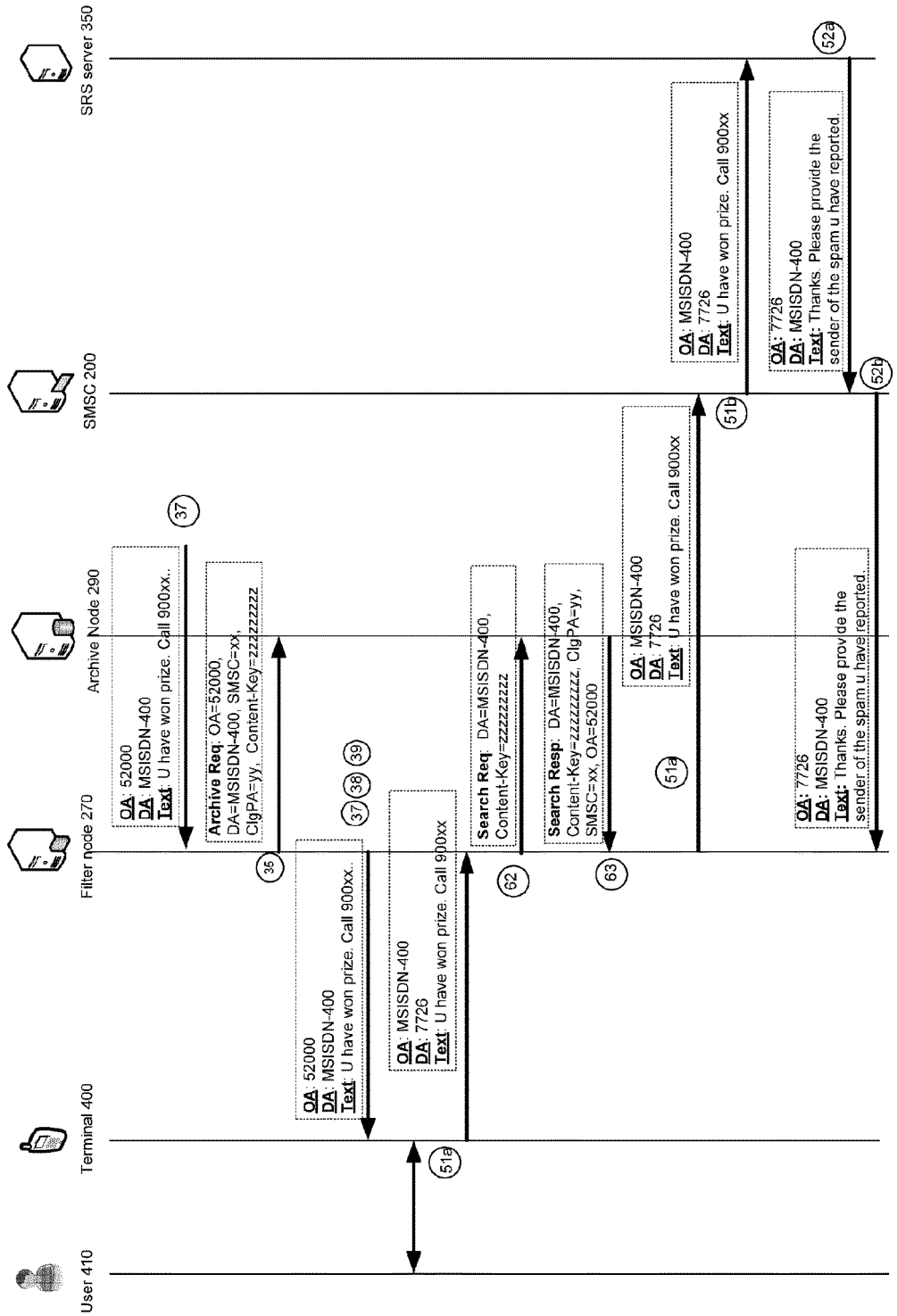
FIGS. 5a and 5b are a call flow diagram showing an alternate embodiment of the invention.
Figure 5B:
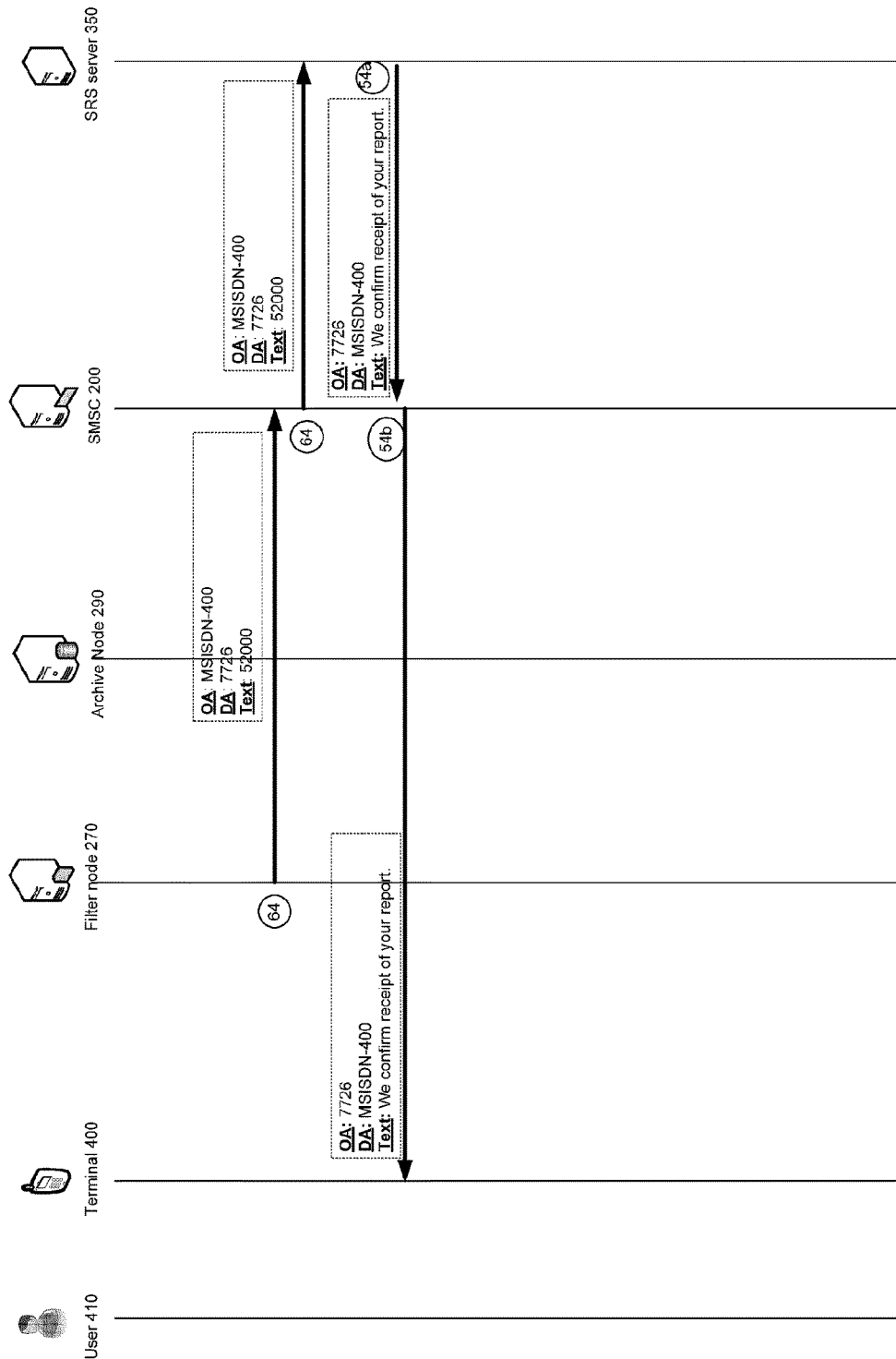

FIGS. 5a and 5b illustrate an alternate embodiment of the invention in which the Filter Node is configured to retain a two-stage dialogue with the SRS server while implementing a one-stage dialog with the reporting user 410. This has the advantage that existing SRS servers do not need to be modified to implement the invention in order to achieve the associated improved user experience.

In FIGS. 5a and 5b, as described above for FIG. 4, the network has been configured to cause all SMS messages coming from vulnerable sources to pass through the Filter Node. MT-SMS message 37 is therefore routed through the Filter Node 270. The Filter Node 270 creates a record 35 corresponding to SMS message 37. The record includes the text content of the message and metadata extracted from the messages, such as Originating Address (or Calling Number), Destination Address, originating SMSC address, originating network address, etc. The Filter Node 270 may optionally generate a unique id or content hash key for the content of the SMS message which can be stored along with the original text content or place of the original text content. The content hash key can be a checksum of the content or any unique hash value that the content characters or octets can generate.

As the SMS message 37 is not detected as spam by the Filter Node, the Filter Node routes the SMS message onward via the T-MSC and the BSC (as signal 38) and it arrives to the mobile device 400 as an MT-SMS delivery signal 39 delivered over the radio interface. When user 410 receives the SMS message at his mobile terminal 400, he identifies it as a spam SMS (based on the content and potentially the calling number). Knowing that his operator provides a spam reporting service, he then forwards the spam SMS to the SRS address, which in the embodiment shown is "7726". The user uses an SMS forward function provided on his mobile terminal 400 to forward the spam SMS message, thereby creating a report message 51a which is routed to the SMSC. The network or SMSC is configured to route messages destined to the SRS address via the Filter Node 270. The report SMS message 51a indicating that the message 39 is spam is routed to the Filter Node 270.

The Filter Node analyses the report SMS message 51a and based on the destination address value, the Filter Node detects that the message is destined to the SRS server. The Filter Node determines that it needs to determine the original Calling Number and other meta-data associated with the original spam SMS message. To achieve this, the Filter Node generates a content hash key from the content of the report SMS message and sends a query (signal 62) to the Archive Node 290 requesting the Archive Node to retrieve the record corresponding to the spam SMS message from the archive.

The query signal 62 contains the generated content hash key and the destination address of the original spam SMS message (which is actually the originating address of the report SMS message). The Archive Node 290 searches its store to find the original message matching the content hash key and the destination address. Once the original message is found, the Archive Node returns a query response 63 to the Filter Node 270. The query response 63 contains the Calling Number and the other metadata (e.g. SMSC address, originating network address, etc) which was stored with the original spam SMS message.

The Filter Node stores the Calling Number and metadata in a transaction context cache (or storage area) associated with the Originating Number of the report SMS message. The Filter Node also relays the report SMS message "unmodified" (as signal 51a/51b) to the SRS server 350 via the SMSC 200. The SRS server determines that the report SMS message does not contain the original calling number (digits 52000 in the example flow of FIG. 5). The SRS server sends a request SMS message 52a back to the reporting user's terminal 400 (as shown in the prior art system of FIG. 1b). The text of the request SMS message is a request to the user 410 to supply the missing calling number of the spam SMS message 39. The request SMS message 52a is submitted to the SMSC and the SMSC delivers it as an MT-SMS message 52b towards the user's mobile terminal 400.

The network is configured to route messages originated from the SRS server address (e.g. 7726) through the Filter Node and so the request SMS message 52b destined to the user's terminal 400 is routed via the Filter Node 270. The Filter Node determines that the SMS message is indeed an SRS request message to the user 410 requesting the Calling Number. This determination may be made based on the text content of the request SMS message and the originating address (i.e. 7726). The Filter Node then looks up the transaction context cache for the user's MSISDN (which is the destination address of the SRS response SMS message) to retrieve the Calling Number and other meta-data extracted from the original spam SMS message. The Filter Node terminates the SRS request message 52b with an MT-SMS positive acknowledgement, so that it does not pass for delivery to the reporting user's mobile terminal. The Filter Node originates a new SMS message 64 simulating a reply SMS message from the user 410 and his mobile terminal 400. The Filter Node generated reply SMS message thus has the Originating MSISDN Number of the user's terminal 400 and the Destination Number of the SRS server. The content of the generated reply includes the Calling Number and optionally other metadata as retrieved from the aforementioned Filter Node transaction context cache. The Filter Node submits this generated reply SMS message to the SMSC 200 (signal 64), and the SMSC then routes this message to the SRS server 350, where it is associated with the report message 51b. The SRS server then optionally sends its final confirmation SMS message back to the user, depicted as signal 54a and 54b in FIG. 5. It should be noted that this final confirmation SMS message may also be routed via the Filter Node. However, the Filter Node in this instance will recognize that this message is a final confirmation SMS message and not an SRS request message requesting the Calling Number. The Filter Node thus allows this confirmation message to pass unmodified for delivery to the user's mobile terminal 400. The Filter Node also clears the transaction context cache entry to allow subsequent spam reports from the user's terminal 400 to be associated with the "correct" Calling Number and other meta-data stored in the Archive Node.

The above method also needs to cater for the situation where the Archive Node does not find any record for the original spam SMS message. In this case, the Filter node records this "no data" fact in the transaction context cache, or generates an empty context cache entry. Thus when the Filter Node receives the SRS request message 52b requesting the Calling Number, it determines that there is no record of the spam SMS message in its transaction context cache and thus it allows the SRS response to pass to the user's terminal 400.

In a situation where the user 410 reports two or more received SMS messages (which are each different in content) as spam messages to the SRS server in quick succession, the Filter Node will create multiple transaction context cache entries associated with the user's terminal 400. In this case the Filter Node uses a mechanism such as a timestamp or sequence number in the transaction context cache entry to associate the correct context cache entry with each instance of the SRS request SMS message 52b. Alternatively, the SRS server can be configured to return the starting portion of the reported spam SMS message in the request SMS message. This can be used by the Filter Node to better enhance the correlation of the transaction context cache entry with the original spam SMS message.

Figure 6:
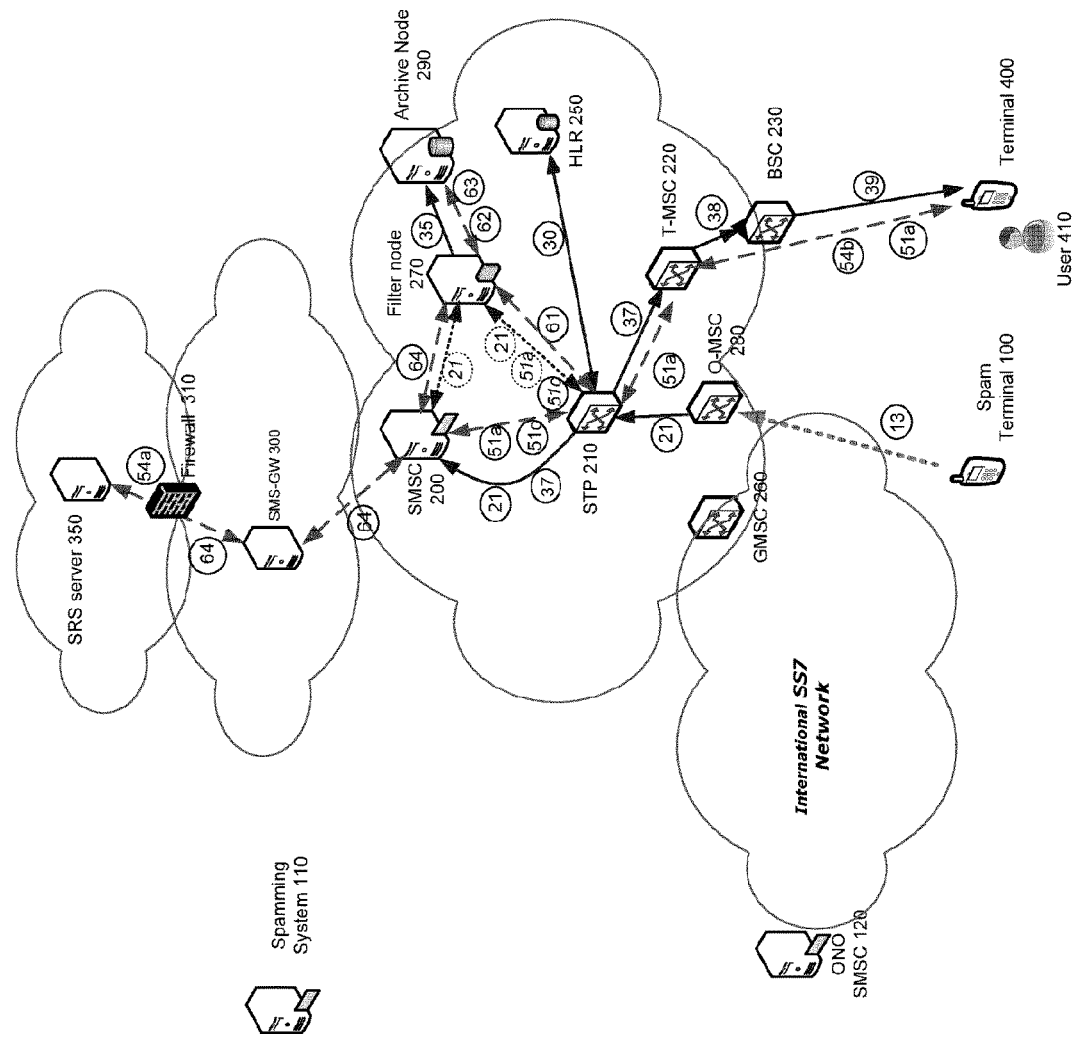
FIG. 6 is a block diagram of a portion of a mobile telecommunications network, according to an alternate embodiment of the present invention.

FIG. 6 is a block diagram of a mobile network illustrating an embodiment where a spam mobile message is originated by an on-net SIM (or SIM box device) 100 and is captured by the Filter Node 270 as an MO-SMS before it reaches the SMSC. The mobile network is configured such that all MO-SMS traffic is caused to pass through Filter Node 270 prior to submission to the SMSC 200. The Filter Node is integrated to the STP 210. The Filter Node 270 creates a record corresponding to each MO-SMS message which passes therethrough. The record includes metadata and content extracted from the MO-SMS message. As described above with reference to FIG. 3, the Archive Node 290 stores each of the records. It should be noted that the metadata in these records serve to identify the source as an on-net SIM or SIM box.

Figure 7A:
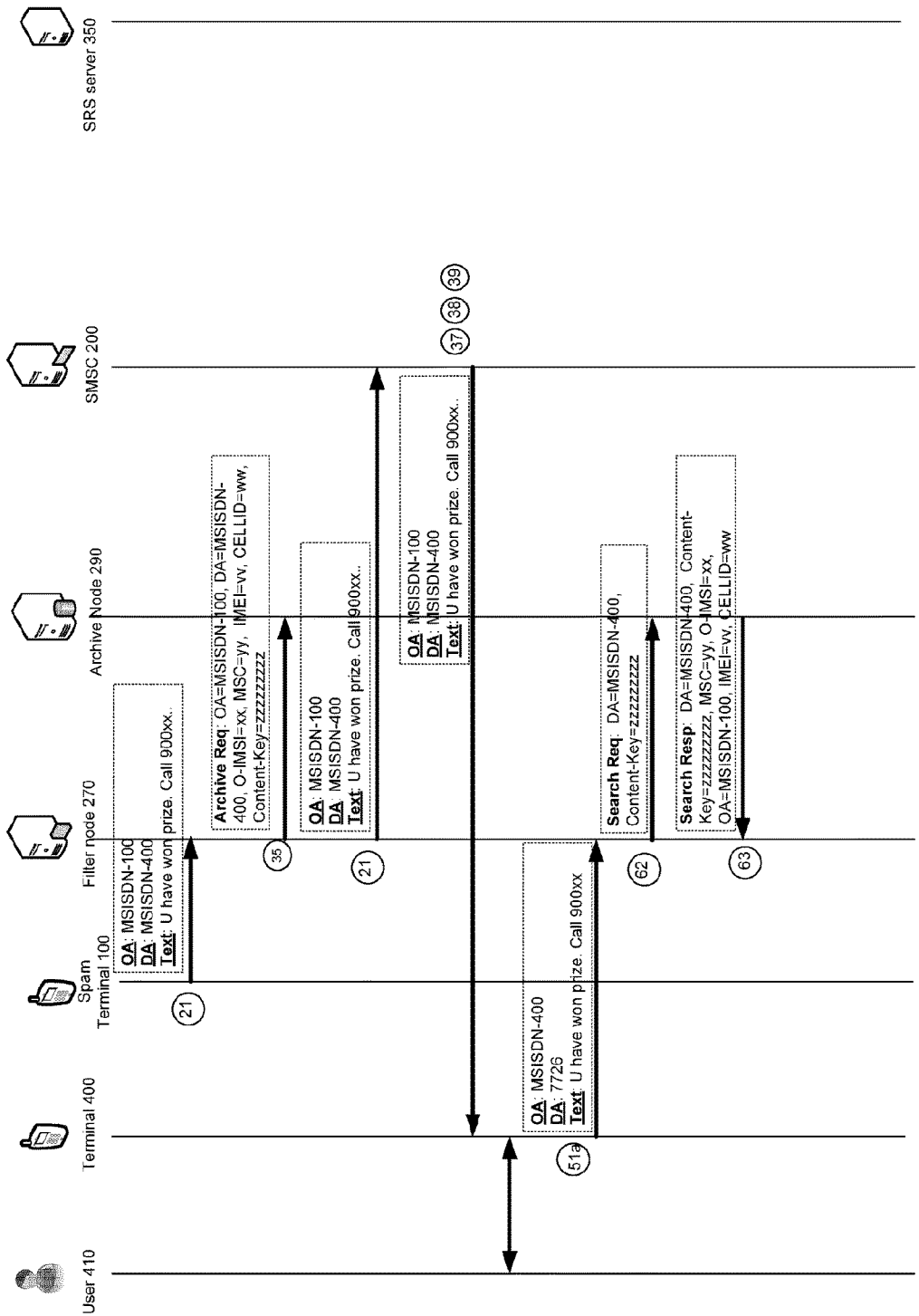
FIGS. 7a and 7b are a call flow diagram showing the operation of the network of FIG. 6.
Figure 7B:
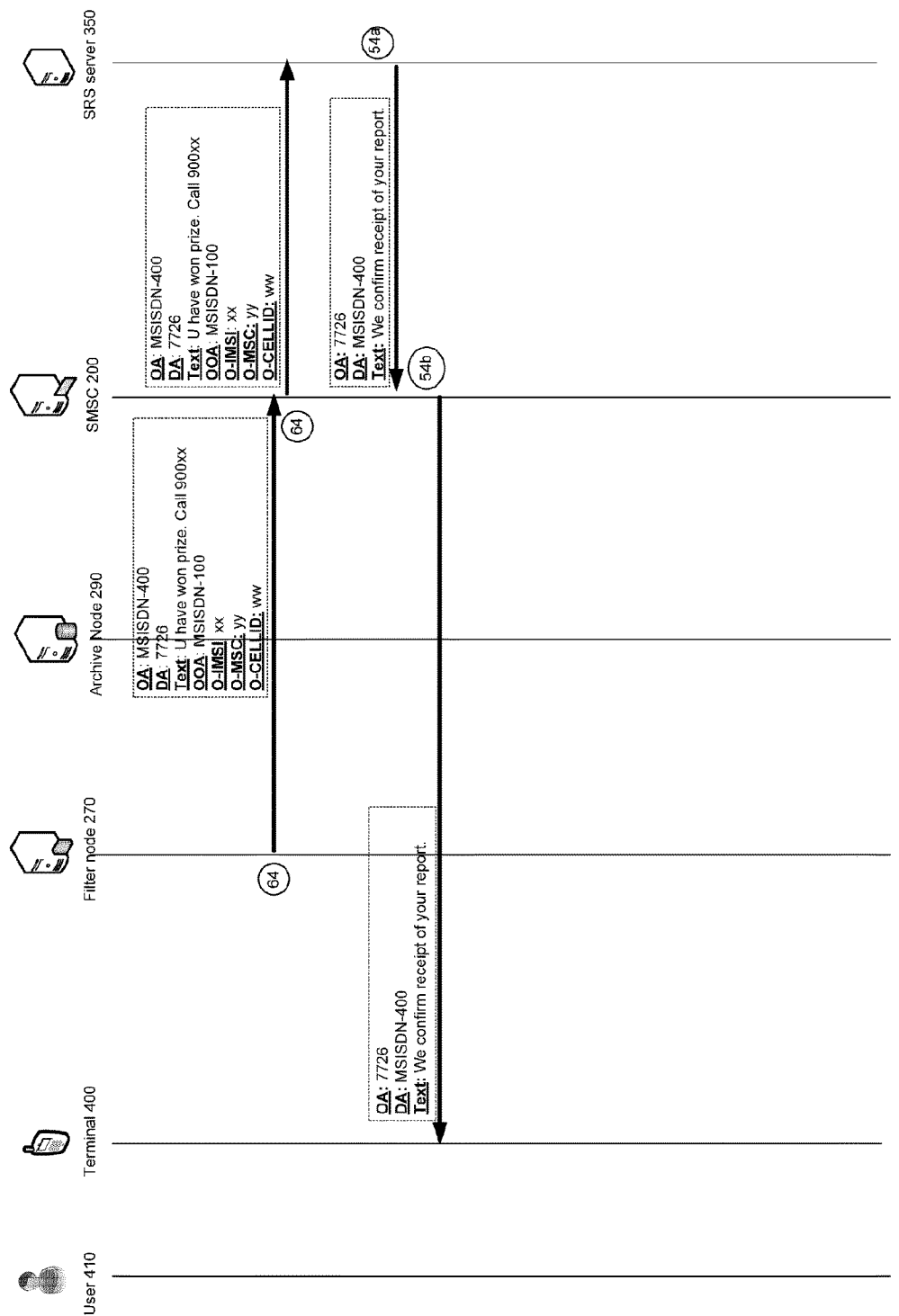

FIGS. 7a and 7b are a call flow diagram illustrating a method for user reporting of spam messages using the network of FIG. 6. As set out above, the network has been configured to cause all MO-SMS messages 13 to pass through the Filter Node 270 (signal 21). The signal path is shown as the dotted signal arrows in FIG. 6, the actual path used depending on which node (SMSC or STP) in the network routed the message towards the Filter Node. As an example in FIG. 6, the STP is routing all MO-SMS messages (signal 21) to the Filter Node 270. However, the same spam reporting method may equally used for MO-SMS messages which pass to the Filter Node directly from the SMSC 200. The Filter Node 270 creates a record 35 corresponding to MO-SMS message 21. The record includes the text content of the message and metadata extracted from the message, such as Originating Address (or Calling Number), Destination Address, originating MSC address, Originating IMSI, etc. The Filter Node 270 may also ascertain other metadata associated with the MO-SMS by querying other systems such as HLR (to determine the Cell-id of the originator). The Filter Node 270 may optionally generate a unique id or content hash key for the content of the SMS message which can be stored along with the original text content or in place of the original text content. The content hash key can be a checksum of the content or any unique hash value that the content characters or octets can generate. The record 35 is transmitted to the Archive Node 290 for storage.

As the "intercepted" SMS message 21 is not detected as spam by the Filter Node, the Filter Node routes the MO-SMS message 21 onward to the SMSC 200, which shall deliver as an MT-SMS message to the recipient, e.g. mobile device 400. When user 410 receives the message, he identifies it as a spam SMS (based on the content). Knowing that his operator provides a spam reporting service, he then forwards the spam SMS to the SRS address, which in the embodiment is shown as "7726". The user uses an SMS forward function provided on his mobile terminal 400 to forward the spam SMS message, thereby creating a report message 51a which is routed to the SMSC. The network or SMSC is configured to route MO-SMS messages destined to the SRS address via the Filter Node 270. The report SMS message 51a indicating that the message content is spam is routed to the Filter Node 270.

The Filter Node analyses the report SMS message 51a and, based on the destination address value, the Filter Node detects that the message is destined to the SRS server. The Filter Node determines that it should add the original Calling Number and other meta-data to the spam report SMS message. To achieve this, the Filter Node generates a content hash key from the content of the report SMS message and sends a query (signal 62) to the Archive Node 290 requesting the Archive Node to retrieve the record corresponding to the spam SMS message from the archive. The query signal 62 contains the generated content hash key and the destination address of the original spam SMS message (which is actually the originating address of the report SMS message). The Archive Node 290 searches its store to find the record 35 corresponding to the original MO-SMS message 21 by matching the content hash key and the destination address. Once the original message is found, the Archive Node returns a query response 63 to the Filter Node 270. The query response 63 contains the Calling Number and the other metadata (e.g. MSC address, originating IMSI, etc) which was stored with the original spam SMS message. The Filter Node 270 associates the metadata with the report SMS message 51a and forwards the metadata to the SRS server to allow the SRS server to identify the source of the spam SMS message (which in this case is a SIM). The metadata may also be used to identify the mobile equipment (which is, of course, separate to the SIM) and its location etc. The forwarding of the metadata to the SRS server can be done in a number of ways as outlined above in relation to FIG. 4.

A similar approach to that shown in FIGS. 6 and 7 may be taken for MO-SMS originated from an on-net SIM or SIM box and routed to the Filter Node by the SMSC. Application originated messages (AO-SMS) originated from an external ESME or Large Account application and routed to the Filter Node by the SMS-GW or SMSC may also be treated similarly.

The embodiments described above relate to 2G GSM mobile networks. However, the invention may also be implemented in 3G and next generation mobile networks and CDMA mobile networks in 3G or next generation networks. In such networks, different equivalent nodes may be present. For example, a Radio Network Controller (RNC) is the equivalent of a BSC in a 3G UMTS network. The invention may also be implemented to allow spam reporting of MMS messages, in which case an MMSC performs the functions described in relation to the SMSC in the embodiments set out above.

The words "comprises/comprising" and the words "having/including" when used herein with reference to the present invention are used to specify the presence of stated features, integers, steps or components but does not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method for user reporting of spam mobile messages, the method comprising:
   causing mobile messages to pass through a filter node prior to delivery to a user;
   in the filter node, creating a record corresponding to each mobile message, the record including metadata extracted from the mobile message and content of the mobile message;
   storing each record in an archive;
   routing each mobile message to the user;
   receiving a report message from the user indicating that a mobile message received by the user is a spam mobile message;
   retrieving the record corresponding to the spam mobile message from the archive;
   associating the metadata in the retrieved record with the report message.

2. The method as claimed in claim 1, further comprising:
   using the metadata to identify a source of the spam mobile message.

3. The method as claimed in claim 1 the method, wherein the step of receiving the report message comprises intercepting the report message at the filter node and the steps of retrieving and associating are also carried out in the filter node and wherein the method further comprises relaying the report message and the associated metadata to a Spam Reporting Service (SRS) server.

4. The method as claimed in claim 1, wherein the step of receiving the report message comprises intercepting the report message at the filter node, and the method further comprises:
   relaying the report message from the filter node to a Spam Reporting Service (SRS) server; and
   intercepting, at the filter node, a request from the SRS server for the metadata,
   wherein associating the metadata with the report message comprises providing the metadata to the SRS server in an additional message in response to the request.

5. The method as claimed in claim 1, wherein the metadata extracted from the mobile message includes a calling number of the mobile message.

6. The method as claimed in claim 5, wherein the metadata extracted from the mobile message further includes one or more of:
   a source network address of the mobile message;
   a network address of a messaging center node such as a Short Message Service Center (SMSC) node or Multimedia Messaging Service Center (MMSC) node associated with the mobile message;
   an International Mobile Subscriber Identity (IMSI) associated with the user;
   an International Mobile Subscriber Identity (IMSI) associated with a source of the mobile message;
   a Mobile Switching Center (MSC) or Visitor Location Register (VLR) address associated with the user;
   a MSC/VLR address associated with the source of the mobile message;
   an International Mobile Equipment Identity (IMEI) associated with the source of the mobile message;
   an Internet Protocol (IP) address associated with the source of the mobile message; and
   a cell-id associated with the source of the mobile message.

7. The method as claimed in claim 1, wherein storing each record in the archive comprises storing the content of the message in cleartext format.

8. The method as claimed in claim 1, wherein storing each record in the archive comprises storing the content of the message in a form of a content hash key based on an algorithm performed on content characters of the mobile message.

9. The method as claimed in claim 8, wherein the content hash key is based on a checksum of the content characters of the mobile message.

10. The method as claimed in claim 8, wherein the retrieving step further comprises:
    upon receipt of the report message from the user, computing a content hash key of content of the report message; and
    identifying the record corresponding to the mobile message by comparing the content hash key of the report message and an MSISDN of the user to a plurality of records in the archive.

11. The method as claimed in claim 1, wherein the report message is a mobile message forwarded by the user to a spam reporting address in order to report the message as spam.

12. The method as claimed in claim 1, wherein associating the metadata in the retrieved record with the report message comprises one of the following:
    creating a new report message including the content of the report message and the metadata;
    appending the metadata to the report message; and
    providing the metadata in an additional message in response to a request.

13. A system for user reporting of spam mobile messages comprising:
    means, in a network, for causing mobile messages to pass through a filter node prior to delivery to a user;
    means, in the filter node, for creating a record corresponding to each mobile message, the record including metadata associated with the mobile message and content of the mobile message;
    means, in an archive node, for storing each record in an archive;
    means, in the filter node, for routing each mobile message to the user;
    means, in the filter node, for receiving a report message from the user indicating that a mobile message received by the user is a spam mobile message;
    means, in the filter node, for retrieving the record corresponding to the spam mobile message from the archive; and
    means, in the filter node, for associating the metadata in the retrieved record with the report message.

14. A method for facilitating user reporting of spam mobile messages in a filter node, the method comprising:
    intercepting mobile messages prior to delivery to a user;
    creating a record corresponding to each mobile message, the record including metadata associated with the mobile message and content of the mobile message;
    storing each record in an archive;
    allowing each intercepted mobile message to pass to the user;

intercepting a report message from the user indicating that a mobile message received by the user is a spam mobile message;

retrieving the record corresponding to the spam mobile message from the archive;

associating the metadata in the retrieved record with the report message; and relaying the report message and the associated metadata to a Spam Reporting Service (SRS) server.

15. A filter node for facilitating user reporting of spam mobile messages, the node comprising:

means, in the filter node, for intercepting mobile messages prior to delivery to a user;

means, in the filter node, for creating a record corresponding to each mobile message, the record including metadata associated with the mobile message and the content of the mobile message;

means, in the filter node, for storing each record in an archive;

means, in the filter node, for allowing each intercepted mobile message to pass to the user;

means, in the filter node, for intercepting a report message from the user indicating that a mobile message received by the user is a spam mobile message;

means, in the filter node, for retrieving the record corresponding to the spam mobile message from the archive;

means, in the filter node, for associating the metadata in the retrieved record with the report message; and means, in the filter node, for relaying the report message and the associated metadata to a Spam Reporting Service (SRS) server.

16. A system for user reporting of spam mobile messages comprising:

a filter node;

a network configured to cause mobile messages to pass through the filter node prior to delivery to a user;

wherein the filter node is configured to create a record corresponding to each mobile message, the record including metadata associated with the mobile message and the content of the mobile message;

an archive node configured to store each record in an archive;

wherein the filter node is further configured to:

route each mobile message to the user;

receive a report message from the user indicating that a mobile message received by the user is a spam mobile message;

retrieve the record corresponding to the spam mobile message from the archive; and associate the metadata in the retrieved record with the report message.

17. A filter node for facilitating user reporting of spam mobile messages, the node comprising:

first intercepting means configured to intercept mobile messages prior to delivery to a user;

record creation means configured to create a record corresponding to each mobile message, the record including metadata associated with the mobile message and the content of the mobile message;

storage means configured to store each record in an archive;

forwarding means configured to allow each intercepted mobile message to pass to the user;

second intercepting means configured to intercepting a report message from the user indicating that a mobile message received by the user is a spam mobile message;

retrieval means configured to retrieve the record corresponding to the spam mobile message from the archive;

association means configured to associate the metadata in the retrieved record with the report message; and relaying means configured to relay the report message and the associated metadata to a Spam Reporting Service (SRS) server.

* * * * *